United States Patent [19]
Boggs et al.

[11] Patent Number: 6,147,848
[45] Date of Patent: Nov. 14, 2000

[54] PULSE WIDTH MODULATION DRIVER HAVING PROGRAMMABLE CURRENT CONTROL

[75] Inventors: Brian L. Boggs, East Peoria; Paul C. Gottshall, Washington; Steven O. Hart, Morton; Brian G. McGee, Chillicothe, all of Ill.

[73] Assignee: Caterpillar Inc., Peoria, Ill.

[21] Appl. No.: 09/217,023

[22] Filed: Dec. 21, 1998

[51] Int. Cl.$^7$ ...................................................... H02H 3/18
[52] U.S. Cl. ........................... 361/93.2; 361/87; 323/283; 340/650
[58] Field of Search ............................... 361/78, 87, 93.1, 361/93.2, 93.9; 363/50, 74, 78; 323/276, 277, 271, 283–285; 324/629, 647, 522; 340/650, 657, 664

[56] References Cited

U.S. PATENT DOCUMENTS

| | | | |
|---|---|---|---|
| 4,357,572 | 11/1982 | Andersen et al. | 323/286 |
| 4,825,347 | 4/1989 | Guerrera et al. | 363/41 |
| 4,827,391 | 5/1989 | Sills | 363/41 |
| 4,972,130 | 11/1990 | Rossi et al. | 318/293 |
| 5,400,236 | 3/1995 | Shimizu et al. | 363/37 |
| 5,479,090 | 12/1995 | Schultz | 323/284 |
| 5,550,498 | 8/1996 | Kwan et al. | 327/175 |
| 5,677,618 | 10/1997 | Fiez et al. | 323/282 |
| 5,719,474 | 2/1998 | Vitello | 315/307 |
| 5,777,462 | 7/1998 | Yue | 323/285 |
| 5,880,947 | 3/1999 | Imanaka et al. | 363/89 |

*Primary Examiner*—Josie Ballato
*Assistant Examiner*—Kim Huynh
*Attorney, Agent, or Firm*—Steven G. Kibby

[57] ABSTRACT

A pulse width modulation driver provides programmable current control for a variety of load current ranges using a modulation feedback block. The block scales a signal representative of a sensed current flowing through the load by a selectable gain multiplier. The scaled signal is compared to a target current value to indicate to a driver control when to generate trigger signals for switching current through the load. In this way, load currents can be amplified to match the operational range of the comparator.

15 Claims, 3 Drawing Sheets

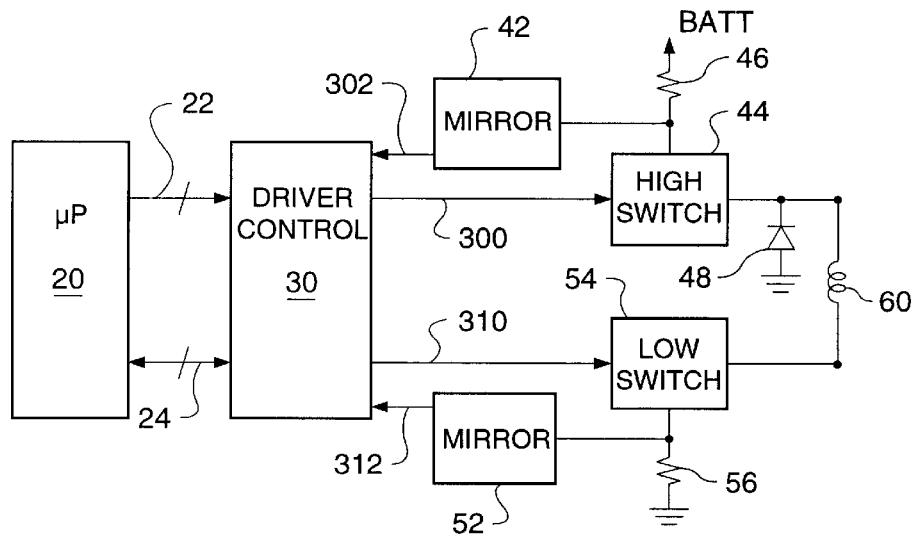
Fig-1-
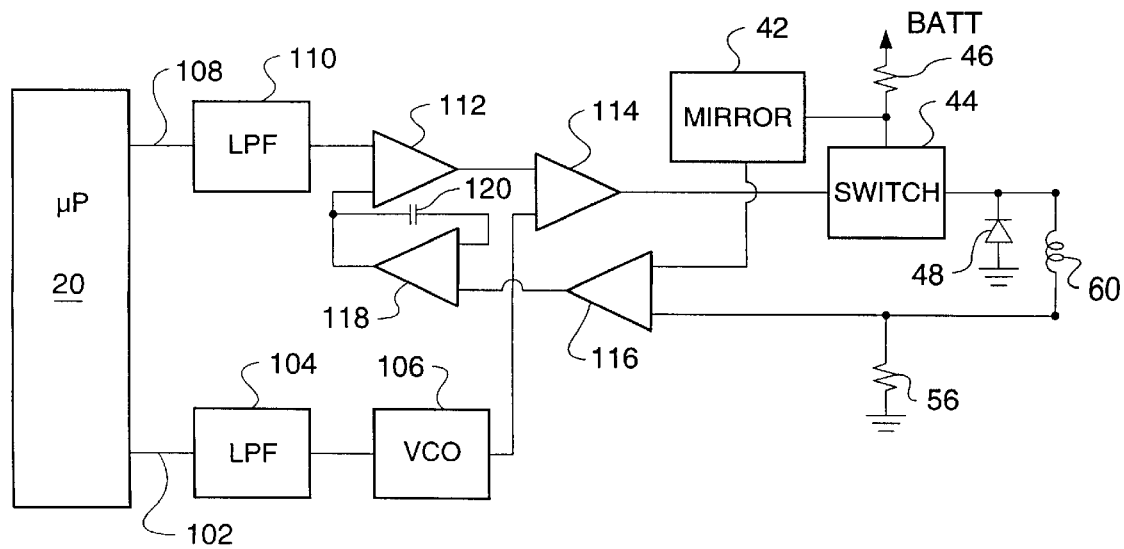
Fig-2-

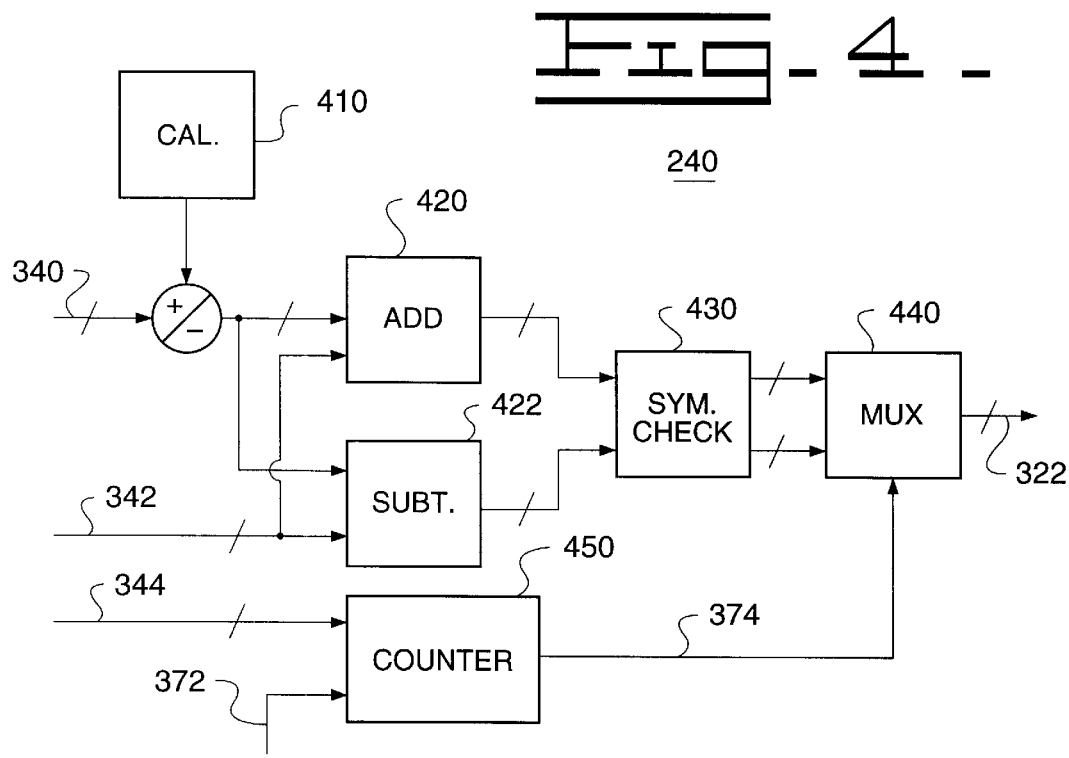
Fig-4-
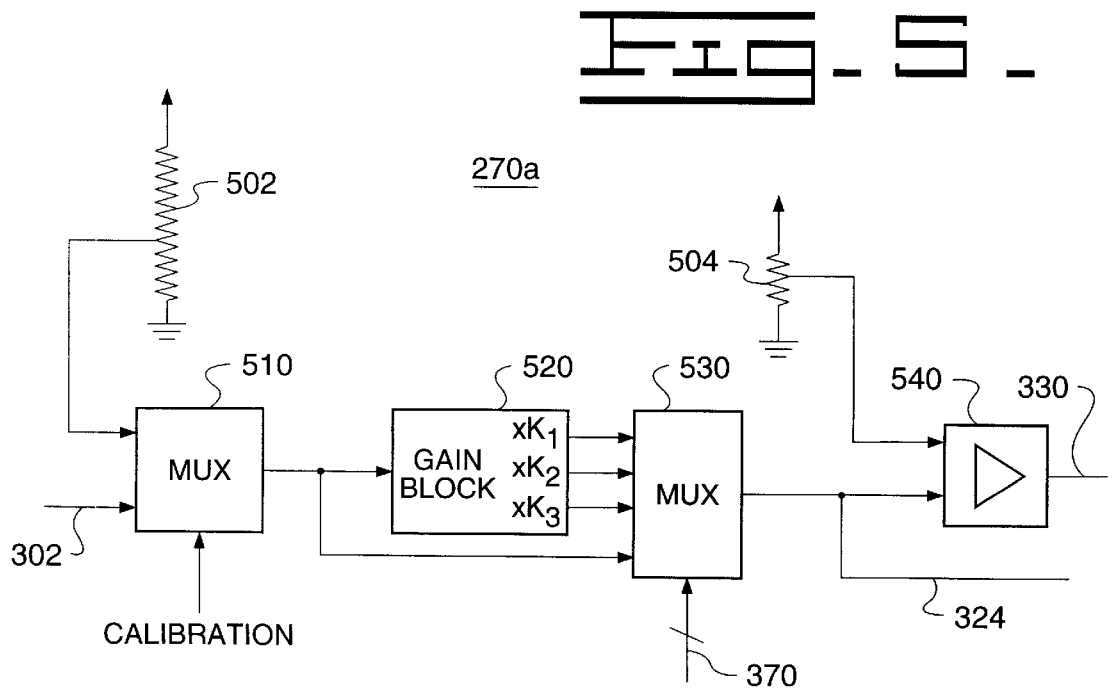
Fig-5-

PULSE WIDTH MODULATION DRIVER HAVING PROGRAMMABLE CURRENT CONTROL

DESCRIPTION

1. Technical Field

The present invention is directed to a system for maintaining a desired current level through a resistive or inductive load, and more specifically to pulse width modulation driver having a programmable current range.

2. Background Art

A PWM driver attempts to maintain a desired current level through a load by modulating the duty cycle of a direct current (DC) source being switched at a designated frequency. A PWM driver controller selectively supplies low amperage trigger signals to a switched power circuit, for example to the gate of a N-channel MOSFET transistor electrically connected in series with the load and DC source, such as a battery (BATT). A sensed value representative of the current flowing through the load is in turn fed back to the controller, in order to enable the switch to be turned off when the current is above the desired level and turned on when below the desired level.

It is generally desirable to enable the target current to be variably selected under the control of a programmed microprocessor. For example, the microprocessor may supply the PWM driver controller with a target current control signal, having a duty cycle representative of the desired load current, and a switching frequency control signal having a duty cycle representative of the desired frequency. Such an arrangement however, ties up two serial data lines of the microprocessor for each PWM driver utilized. Even when it is possible for multiple PWM drivers to share the same switching frequency control signal, continuously generating the appropriate control signals requires additional program code and some substantial portion of the time available to the microprocessor needed for overall system control.

The conventional circuitry for comparing the sensed current to the target current, such as a differential amplifier, is designed for comparison over only a limited current range. Accordingly, the sensing circuitry must be individually selected to provide appropriate proportional attenuation between the range of currents which flow through the load and the operational range of the comparator. Such limitations make it difficult to standardize the PWM control for a variety of loads, or control a single load accurately in both high current and low current operations.

The present invention is directed to overcoming one or more of the disadvantages set forth above.

DISCLOSURE OF THE INVENTION

According to one aspect of the present invention, a driver for producing a desired pulse width modulated current through a load has a modulation feedback block for scaling a signal representative of a sensed current flowing through the load by a selectable gain multiplier. A comparator compares the scaled signal to a target current value supplied by target generator, and a driver control selectively generates trigger signals to switch current through the load in response to the result of the comparison.

The modulation feedback block may advantageously be provided with a gain block for scaling the sensed current signal by a number of different gain multipliers, and selecting one therebetween to provide a scaled signal for use by the comparator according to a desired load current range.

According to another aspect of the invention, the scaled sensed current may be utilized to detect a short to ground in the load circuit as a function of the selected load current range.

A more complete appreciation of the invention will become apparent by reference to the following detailed description of certain present preferred embodiments thereof and certain present preferred methods of practicing the same, in conjunction with the accompanying drawings in which like reference symbols indicate the same or similar components.

BRIEF DESCRIPTION OF THE DRAWINGS

FIG. 1 illustrates a programmable PWM driver control according to the present invention, in combination with a microprocessor, power circuit and load.

FIG. 2 schematically illustrates a conventional average current controlled pulse width modulation driver.

FIG. 4 is a schematic illustration of a target generator module.

FIG. 5 is a schematic illustration of scaling block and load short detection elements.

BEST MODE FOR CARRYING OUT THE INVENTION

Figure 3:
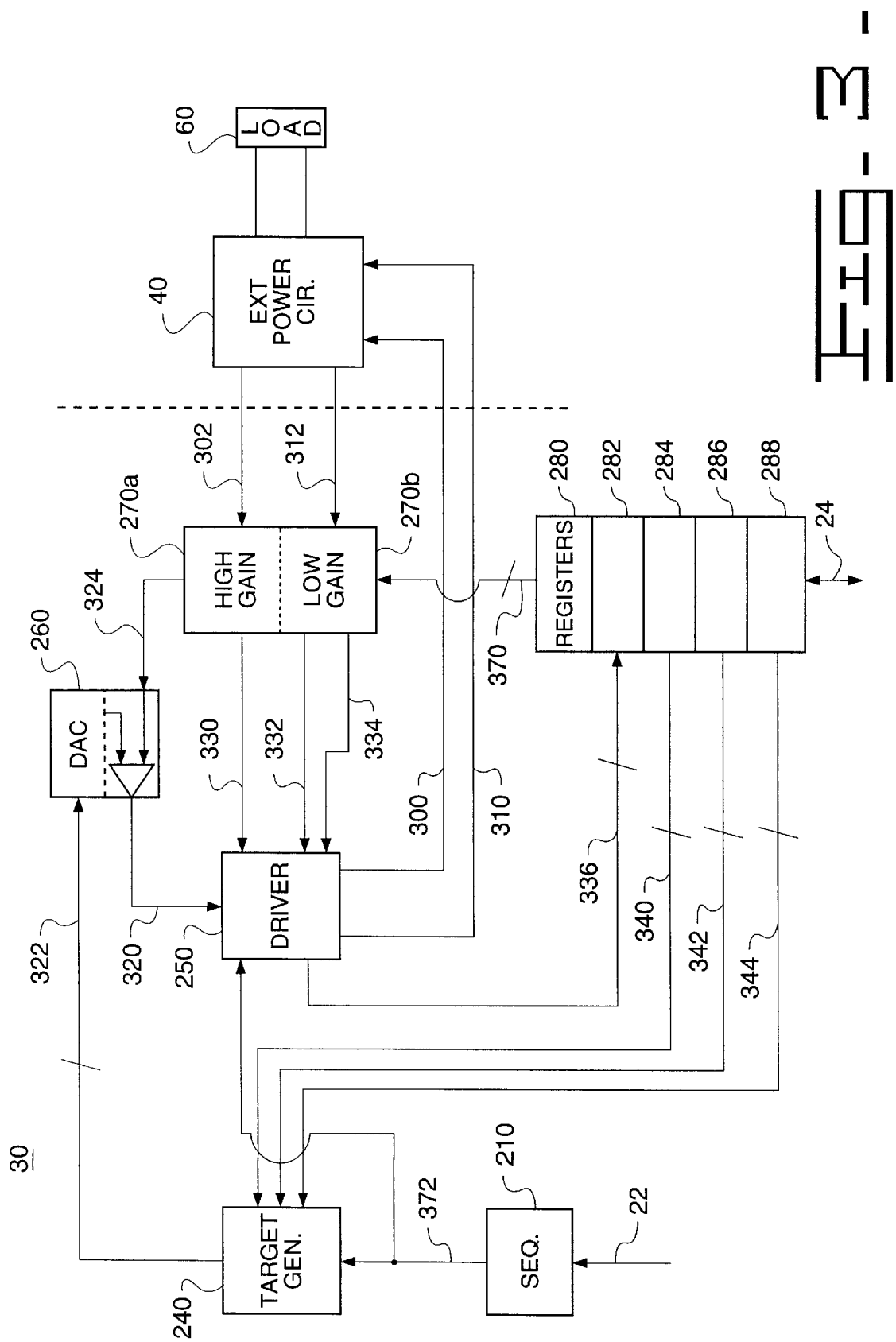
FIG. 3 is a schematic illustration of a programmable PWM driver control, power circuitry, and a load.

Turning first to FIG. 1, a microprocessor 20 is in periodic communication with the PWM driver controller 30 via a data bus 24 and a plurality of control signal lines 22. The microprocessor 20 preferably supplies to the controller 30 ten bit data words, representing respectively a desired load current, dither half-frequency and half-amplitude, and one or more control signal words. The words are stored within memory registers (not shown) in controller 30, which thereafter autonomously modulates switches 44 and/or 54 to supply current to the load 60. Once an initialization routine has been run to enable the controller 30, PWM current control continues until microprocessor 20 overwrites one or more of the registers with new data, or a fault is detected, as described hereinafter.

For purposes of illustration, the present invention is shown in FIG. 1 as a single PWM controller 30 in communication with switches 44 and 54 on the high (BATT) and low (ground) sides of the load through modulation enable (MOD) and diagnostic enable lines 300 and 310, respectively. Controller 30 also receives modulate and diagnostic feedback voltages using current mirrors 42, 52 and current sense resistors 46, 56, which are representative of the amount of current flowing though the load 60. It should be understood that the selection of the high side terminal as the modulation terminal, and the use of two switches and two current mirrors is merely illustrative, and does not form part of the present invention. In the present preferred mode contemplated by Applicants, four controllers 30 are combined on a single application specific integrated circuit, and different resistive and/or inductive loads can be connected to each.

A flyback diode 48 grounds the switched terminal of load 60 in order to recover stored energy when the battery BATT is disconnected by switch 44.

In the disclosed embodiment, PWM driver control is based upon peak current levels, although the load may still respond to a lower RMS current since the switching frequency is so fast that an actuator does not appreciably move as a result of current ripple. There are preferably at least four user selectable switching frequencies, corresponding to divided clock CLK input frequencies CLK/800, CLK/1600, CLK/3200, and CLK/6400. For a sixteen megahertz clock input, the switching frequency is selectable between two and one half and twenty kilohertz, or as often as every fifty microseconds, making the peak and RMS current values very close to one another. This permits current control to within three percent of full scale, because the difference is programmable and linear and consequently correctable by offsetting the target current value. Accordingly, by providing a suitable offset map, the present peak current control may be configured as a load independent average current controller.

By contrast, FIG. 2 schematically shows a PWM driver system configured for conventional average current control, in order to better illustrate the advantages of the present invention. A microprocessor 20 generates a switching frequency control signal on input line 102, which is supplied as an analog voltage level to voltage controlled oscillator 106 by low pass filter 104 for generating a triangular wave form having a frequency proportional to the duty cycle of signal 102. Similarly, a target current control signal on input line 108 generated by microprocessor 20 is supplied as a target reference voltage level $V_{REF}$ to a differential amplifier 112 by low pass filter 110. An error signal $V_{ERR}$ corresponding to the difference between $V_{REF}$ and an output feedback voltage level $V_{OF}$ representative of the current flowing through the load is supplied by differential amplifier 112 to differential amplifier 114.

The error signal $V_{ERR}$ is continuously compared to the triangular wave form F having a desired duty cycle in amplifier 114, in order to supply a trigger signal to activate switch 44 during a specified portion of the duty cycle wherein $V_{ERR}$ exceeds the instantaneous value of wave form F. In the circuit illustrated in FIG. 2, the feedback voltage $V_{OF}$ supplied to differential amplifier 112 is generated by integrating through an operational amplifier 118 tied to zero, voltage levels measured at the high and low voltage sides of the load combined by summing amplifier 116. The integrated feedback voltage signal has a large phase lag however, making the driver unable to respond quickly to large changes in the load current and potentially permitting the load or driver circuits to be damaged. Consequently, it has heretofore been necessary for the microprocessor to provide a series of stepped targets to the PWM controller, for example one quarter scale per step, in order to enable the representative feedback voltage $V_{OF}$ to catch up to the actual load current. Accordingly, it would be desirable to provide peak current control of a PWM driver, in order to enable instantaneous response to changes in the load current and simplify the generation of target control signals.

FIG. 3 shows a block diagram of a PWM driver controller 30 according to one embodiment of the present invention, along with external power circuitry 40 and a load 60 not forming part of the invention. The microprocessor 20 writes peak current target, current dither frequency and current dither half amplitude over the parallel data bus 24 into registers 284, 286, 288 associated with the target generator module 240 according to a stored program by supplying appropriate data, address, and chip select signals.

Turning briefly to FIG. 4, the target generator 240 adds and subtracts in elements 420 and 422 respectively, any programmed dither half amplitude digital value received on line 342, from the sum of the desired peak current target received on line 340 and any calibration offset stored in an offset latch 410. Any programmed dither half frequency value received on line 344 is loaded into a counter 450 connected to a multiplexer 440, in order to generate a square wave target wave form by alternately toggling between the two values at the end of each count period. The counter is driven by a clock signal 372 received from sequencer 210.

Symmetry checker subcircuit 430 continually determines whether or not the specified dither amplitude can be centered upon the peak current target. This is important because at either end of the current range, if the square wave height is not twice the dither amplitude and centered on the target, the RMS current will deviate from linearity and result in non-linear movement of the actuator. The target generator continually checks the symmetry of the combined target wave form and automatically attenuates the dither amplitude to a point where it will remain centered. This feature eliminates any need to program the microprocessor to look for such asymmetry or compensate though selection of different dither command values near the extremes of the current range.

Returning to FIG. 3, the instantaneous value of the square wave is simply a digital number which is double buffered and presented to a comparator 260 having a DAC on line 322, for comparing the value to a scaled modulation feedback signal 324. If a zero (0) dither frequency or amplitude is selected, the target generator simply produces a signal corresponding to peak current target plus calibration offset, if any. Comparator 260 provides the result of any comparison between the target current and the scaled modulation feedback from line 324 to the driver control module on line 320. The driver control module selectively provides modulation and diagnostic enable signals to the high side and/or low side switches 44, 54 of the external power circuitry 40 based on the result of the comparison.

The present invention is directed to providing a programmable current range for enabling the PWM driver control 30 to be connected to a wide variety of inductive or resistive loads. The current range must be specified because it is a function of the voltage to current feedback ratio of the current sense resistors 46, 56. In a preferred embodiment, a 0.20 ohm sense resistor is used to provide a feedback ratio of two tenths of a volt per amp going through the load. On this basis, programmable current ranges can be selected between 0–1 amps, 0–2.5 amp; 0–3.75 amps; or 0–6.25 amps. If the feedback ratio is also changed in the external circuitry, virtually any level of gain can be achieved within the power handling capability of the external circuitry. Likewise, the feedback signal can be attenuated by changing the external sense resistor to control over a current range of 0–500 milliamps, for example. Modulation scale block 270a and diagnostic scale block 270b provide selectable gain multipliers for the modulation 302 and diagnostic 312 feedback lines.

FIG. 5 illustrates modulation feedback block 270a. A multiplexer 510 selects between the modulation feedback line 302 and a reference voltage produced by a voltage splitter 502, based upon a calibration control signal. Assuming the modulation feedback is selected, a gain block 520 multiplies the signal by a plurality of different gain multipliers, and either the original or scaled signal is output by multiplexer 530 on line 324 to the comparator 260. The gain register 280 stores a digital value which is supplied to multiplexer 530 on line 370 to select the desired gain multiplier.

Additionally, the PWM driver control 30 may have diagnostic capabilities capable of detecting short circuit or open circuit conditions and disabling the external power circuit 40, as well as storing a diagnostic code which can be read by the microprocessor 20. There are a number of different electrical faults which the control can diagnose and flag.

A first fault, low side short to battery or high side short to ground, results in the entire supply voltage BATT being dumped through a current sense resistor, typically only a couple tenths of an ohm. In this circumstance, the voltage supply needs to be shut off immediately to prevent damage to the current sense resistor. The short circuit trip point is not based on a fixed current level however, but instead utilizes an envelope about the selected current range. The trip point is preferably a function of the selected programmable current range, and most preferably is about fifty percent above the maximum programmed current. For example, if 0–1 amp current range is selected, the trip point is approximately 1½ amps. If the controller senses any kind of signal that indicates that at least 1½ amps are flowing through the load, it is going to trip a short circuit fault.

Returning briefly to FIG. 5, the scaled modulation signal produced on line 324 is also compared in element 540 to a reference voltage, produced for example by a voltage splitter 504 and having the above noted one hundred fifty percent full scale value. If the scaled modulation signal exceeds the reference voltage, a short circuit detection signal will be generated to the driver control 250 over line 330 and handled as described hereinafter.

If either short circuit condition or both are detected, the controller immediately shuts off all output driver channels by controlling the enable pins, generates an interrupt to the microprocessor, and flags the information in a short circuit bit of a diagnostic register 282. Depending upon the application, there may be one, two, three, or more sets of driver switching points at the high or low side of the load. The driver control 250 flags the appropriate bits for that channel in the diagnostic register, so that when the microprocessor reads those registers it is able to appropriately identify the fault and potentially reset the channel if the fault was intermittent or erroneously identified. Short circuits are always going to generate the interrupt because it is a serious fault, a fault that can damage the electronics.

A second and third faults which can be detected are open circuits. This differs from short circuit detection, in that the driver control 250 determines whether a targeted current level has been reached within a fixed time interval, typically a fairly long interval such as about one millisecond. The control 250 also is able to determine if no current at all is flowing through the load on the basis of a minimum current signal on line 334 from the gain block 270. If the controller is unable to lock onto the target current within the fixed time interval and there is no minimal amount of current flowing through the load, the controller flags an open circuit condition. Since an open circuit does not commonly represent any immediate danger to the load or the PWM driver, normal operation can continue until the flag is recognized and cleared or the PWM driver is disabled.

A fourth fault which can be detected is termed a load short, meaning typically a partial or complete short in the load lines, for example a wiring harness, which results in a substantial drop in the resistance seen by the driver. The PWM controller determines whether there is some minimal current flow through the current sense resistors when the switches 44, 54 are turned off. With an inductive load, when the driver transistors are turned off (disabled), a small current should continue to flow through the low side current sense resistor as a result of energy stored in the coil. If there is not, then the driver control 250 flags a load short condition in the diagnostic register. It has to occur several times in a row before the flag is set in order to insure that there is no mistake, but the load short condition is simply flagged in the diagnostic register 282 until eventually read by the microprocessor 20.

Open circuits and load short faults are not necessarily dangerous to the system, so the controller need not necessarily generate an interrupt. As mentioned previously, one object of the present invention is to substantially reduce the demands on the microprocessor. If it is desirable that the microprocessor be immediately made aware of a load short or open circuit however, the controller can alternatively be set to generate an interrupt on the load short line, leaving the microprocessor to distinguish between the faults on the basis of data stored in the diagnostic registers. By setting a bit in a register, each channel can individually be set to determine whether or not open circuits and load shorts should generate interrupts to the microprocessor. For open shorts and load shorts, when the condition causing the fault no longer exists, the diagnostic pins are automatically cleared. Consequently, the microprocessor 20 need not bother with clearing intermittent faults. Once a short to ground is diagnosed however, the flag cannot be cleared unless the microprocessor 20 generates a channel for specific reset.

Most loads behave best if they are switched at the highest available frequency, but there is a tradeoff. The higher the switching frequency, the greater the amount of electromagnetic interference (EMI) which will be generated. The spike is caused by a flyback diode 48 included in the external driver circuit to recover energy when the inductor is disconnected from battery. In order to counteract the EMI generated, the present invention combines four PWM drivers under the sequential control of a single state machine. That is, a sequencer module 210 generates wave forms phase shifted over four different channels, to prevent any two channels from turning on at the same time and generating a voltage spike. While all four channels share the same switching frequency, each controller has to wait a staggered amount of time to turn on, although each can turn off at any time. For a 16 MHz clock input, the start times are separated by 8 microseconds, or basically 8% of the cycle of the total separation.

On initial power-up, the reset pin is low and the PWM driver control 30 powers up in a safe state. All the registers or flip-flops are zeroed, and a power-up sequence must be completed before current will be supplied to the external load. There is a control register 280 with four bits (ten bit register) that enables a driver channel to be turned on, two upper bits in the dither amplitude register for each channel force the driver control module 250 to latch any external driver enable pins low in a (00) state or enable external drive circuitry to be turned on when in either a (01) or a (11) state. Also, unless a non-zero value is written into the peak current target register 284, the control module 250 automatically overrides everything and shuts off any external drive circuitry, ensuring that the PWM driver will never run away.

INDUSTRIAL APPLICABILITY

The operation of the present invention is best described in relation to its use in controlling a variety of inductive and/or resistive loads. For example, microprocessor 20 may be an engine control module (ECM) configured to control a variety of highly inductive solenoid operated valves, as well as primarily resistive loads such as fans and warning lights. By connecting the ECM data bus to any number of PWM driver controls taught by the present invention, along with appropriate combinations of address read/write, and clock lines, the microprocessor essentially "sees" only a series of contiguous memory addresses. Once the PWM driver control is set up by a short initialization routine, it will run on its own until a new command is input, freeing the microprocessor to perform other functions.

While certain present preferred embodiments of the invention and certain present preferred methods of practicing the same have been illustrated and described herein, it is to be distinctly understood that the invention is not limited thereto but may be otherwise variously embodied and practiced within the scope of the following claims.

What is claimed is:

1. A driver for producing a desired pulse width modulated current through a load, comprising:
    a target generator for supplying a target current value;
    a modulation feedback block having
        a gain block for scaling a signal representative of a sensed current flowing through the load by a gain multipliers to generate a plurality of scaled signals, and
        means for selecting one among said sensed and said plurality of scaled signals;
    a comparator for comparing said selected signal to said target current value; and
    a driver control for selectively generating trigger signals to switch current through the load in response to the result of said comparison.

2. The driver of claim 1, wherein said selecting means comprises a first multiplexer having as inputs at least a stored gain multiplier selection value and said scaled signals.

3. The driver of claim 2, further comprising:
    a second multiplexer for supplying to said gain block responsive to a calibration control signal one of said sensed current signal and a reference signal, and
    wherein said modulation feedback block provides to said comparator a scaled said reference signal in response to a said calibration control signal.

4. The driver of claim 3, wherein said sensed current signal is a voltage directly proportional to the current flowing through the load, and said modulation feedback block further comprises a voltage splitter for producing a predetermined voltage as said reference signal.

5. The driver of claim 1, wherein said sensed current signal is provided by a current sense resistor having a predetermined voltage to current feedback ratio representative of the current through the load, said modulation feedback block enabling programmable selection of the load current range over which said comparator and driver control are operable.

6. The driver of claim 5, further comprising:
    an element for comparing said scaled signal to a reference voltage and generating a short circuit detection signal when said signal representative of a sensed current flowing through the load exceeds a percentage of full scale value for a programmed said load current range.

7. The driver of claim 1, further comprising:
    means for generating a short circuit detection signal responsive to said signal representative of a sensed current exceeding a programmed load current range for the driver.

8. The driver of claim 1, further comprising:
    a register storing a programmable value representative of a desired current, and supplying said value to said target generator;
    said comparator comprising a digital to analog converter for converting said target current value from said target generator to an analog signal prior to comparison with said scaled signal representative of a sensed current.

9. The driver of claim 8, further comprising:
    an offset latch storing a calibration offset, said target generator supplying said target current value as a function of at least said calibration offset and said programmable value representative of a desired current.

10. A method of producing a desired pulse width modulated current through a load, comprising the steps of:
    scaling a signal representative of a sensed current flowing through the load by a gain multipliers to generate a plurality of scaled signals;
    selecting one signal from among said sensed current and scaled signals;
    supplying a target current value;
    comparing said selected signal to said target current value; and
    selectively generating trigger signals to switch current through the load in response to the result of said comparison.

11. The method of claim 10, further comprising:
    storing in a register a programmable value representative of a desired current through the load; and
    supplying said target current value as a function of said desired current.

12. The method of claim 11, further comprising:
    providing a scaled reference signal in response to a calibration control signal; and
    comparing said scaled reference signal to a calibration desired current value to generate a calibration offset.

13. The method of claim 12, further comprising storing said calibration offset, wherein said target current value is supplied as a function of at least said calibration offset and said programmable value representative of a desired current.

14. The method of claim 10, further comprising:
    generating a short circuit fault indication when said scaled sensed current signal is a more than a predetermined factor greater than a selected maximum current.

15. A driver for producing a desired pulse width modulated current through a load, comprising:
    means for supplying a target current value;
    means for scaling a signal representative of a sensed current flowing through the load by a selectable gain multiplier;
    means for comparing said scaled signal to said target current value; and
    means for selectively generating trigger signals to switch current through the load in response to the result of said comparison, wherein said scaling means provides a programmable current range over which said current though the load may be switched.

* * * * *